No. 750,344. PATENTED JAN. 26, 1904.
A. E. BRONSON.
MULTIPLE BAKING PAN.
APPLICATION FILED FEB. 19, 1903.
NO MODEL.

Witnesses
E. B. Gilchrist
N. L. Bresnan

Inventor:
Adelbert E. Bronson,
By his Attorneys,
Thurston & Bates

THE NORRIS PETERS CO., PHOTO-LITHO., WASHINGTON, D. C.

No. 750,344. Patented January 26, 1904.

UNITED STATES PATENT OFFICE.

ADELBERT E. BRONSON, OF CLEVELAND, OHIO.

MULTIPLE BAKING-PAN.

SPECIFICATION forming part of Letters Patent No. 750,344, dated January 26, 1904.

Application filed February 19, 1903. Serial No. 144,050. (No model.)

*To all whom it may concern:*

Be it known that I, ADELBERT E. BRONSON, a citizen of the United States, residing at Cleveland, in the county of Cuyahoga and State of Ohio, have invented a certain new and useful Improvement in Multiple Baking-Pans, of which the following is a full, clear, and exact description, reference being had to the accompanying drawings.

The object of this invention is to provide in simple and efficient form a multiple pan suitable for baking bread, &c.

Multiple baking-pans are very useful in that they allow several loaves to be cooked at once with less trouble to the attendant than if several separate pans were used.

The present invention provides the multiple pan in a very strong, neat, and cheap form.

The connection between the individual pans in this invention is such that they may be made on the same dies that make ordinary pans, the difference being that on the adjacent edges the pans are "false-wired" and there is slipped between them a bridging-strip which interlocks with such false-wired edge. The ends of these bridging-strips bend over and lock to a unitary wire which passes around the upper edge of the whole series of pans. Foot-wires are also provided performing the double result of binding the structure into one rigid whole and raising the bottom surface to prevent burning.

The construction is more fully hereinafter described and its essential characteristics are definitely set out in the claims.

Figure 1:
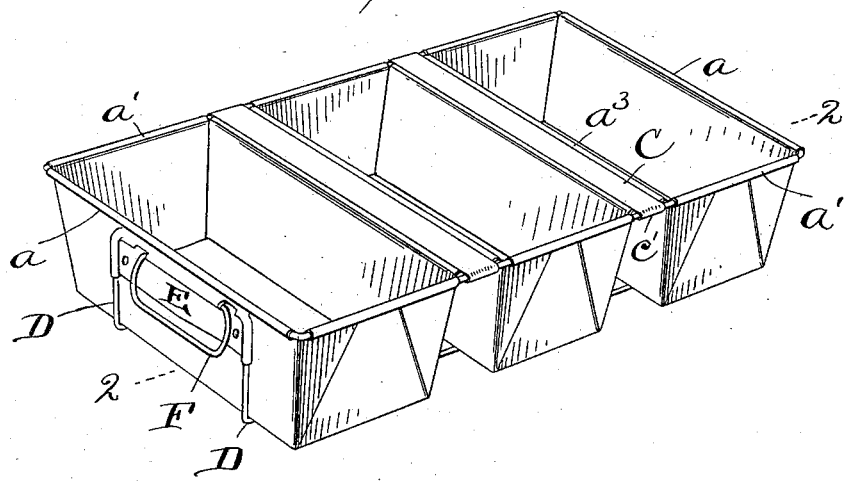
Figure 2:
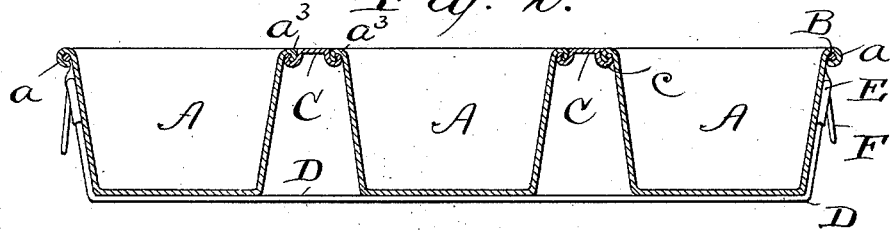
Figure 3:
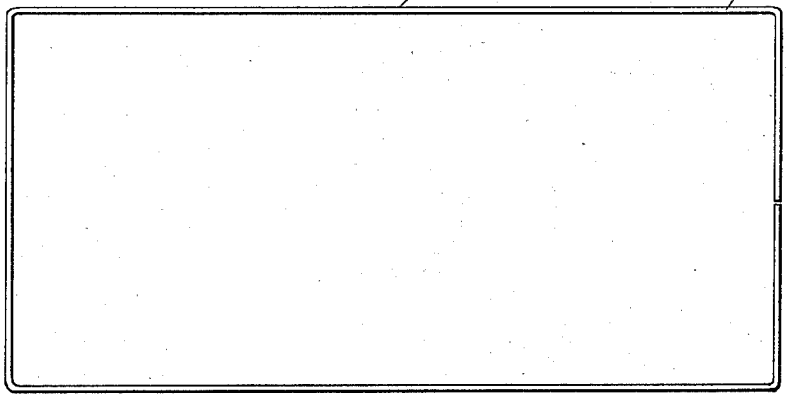

In the drawings, Figure 1 is a perspective view of my multiple baking-pan, showing three compartments or pans. Fig. 2 is a longitudinal section of the multiple baking-pan substantially on the line 2 2 of Fig. 1. Fig. 3 is a plan of the top wire alone.

The number of individual pans used may vary as desired, three being shown, (designated A.) These are made on ordinary dies and are the same as ordinary pans, except that while the ends of all the pans and the outer sides of the extreme pans have complete wiring by the edges $a$ $a'$ being rolled around the top wire B the intermediate sides of the pans have what is called "false-wiring"—that is, there is no wire present; but the edge of the pan $a^3$ is rolled over as if there were such wire. Now between the adjacent pans I slip the bridge-strip C, which has its edges rolled concavely upward, as at $c$, these rolled edges sliding into and interlocking with the downwardly-rolled edges $a^3$ of the pans. The upper surface of the bridge-strip C is flush with the upper edge of the sides of the pan. At its ends $c'$ the bridge-strip is rolled over the top wire B, which passes entirely around the pan. Across the bottoms of the pans extend two foot-wires D D, which are turned upward at their ends and are clamped behind the clamping-plate E. This plate also carries the handle F. The foot-wires keep the bottom surface of the pan out of contact with the oven, and thus prevent burning. In conjunction with the top wire B and the bridge-strips C they rigidly hold the individual pans together.

By the above-described construction it will be seen a very simple and efficient multiple baking-pan is provided. It is cheap to construct, is very efficient in service, and is extremely neat in appearance.

Having described my invention, I claim—

1. A multiple baking-pan having in combination a plurality of individual pans, a unitary wire passing around the pans at their upper edges and secured thereto, a bridge-strip separate from said pans and extending longitudinally between adjacent pans, said bridge-strip being secured to the upper edges of said pans and having its ends secured to said wire, substantially as described.

2. A multiple baking-pan having in combination a plurality of individual pans, a bridge-strip between the upper edges of adjacent pans, the edges of the bridge-strip and the cooperating edges of the pans being complementarily formed to interlock, and means for binding together the said pans, to which means the ends of said pans and said bridge-strip are secured, substantially as described.

3. A multiple baking-pan having in combination a plurality of individual pans, a unitary wire passing around the same at their upper edges, a bridge-strip between adjacent pans, the edges of said bridge-strip and cooperating edges of said pans being complementarily rolled to interlock, substantially as described.

4. A multiple baking-pan having in combination a plurality of individual pans, a unitary wire passing around the same at their upper edges, a bridge-strip between adjacent pans, the edges of said bridge-strip and cooperating edges of said pans being complementarily rolled to interlock, and the ends of said bridge-strip being rolled over said wire, substantially as described.

In testimony whereof I hereunto affix my signature in the presence of two witnesses.

ADELBERT E. BRONSON.

Witnesses:
ALBERT H. BATES,
M. S. METZENBAUM.